United States Patent
Kenyon et al.

(10) Patent No.: US 7,127,235 B2
(45) Date of Patent: Oct. 24, 2006

(54) MULTIPLE PROTOCOL DATABASE

(75) Inventors: Bradley T. Kenyon, Omaha, NE (US); Michael R. Kelly, Omaha, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 504 days.

(21) Appl. No.: 10/426,392

(22) Filed: Apr. 30, 2003

(65) Prior Publication Data

US 2004/0220958 A1 Nov. 4, 2004

(51) Int. Cl.
*H04L 12/58* (2006.01)

(52) U.S. Cl. .................. 455/412.1; 455/552.1

(58) Field of Classification Search ............ 455/412.1, 455/414.1, 445, 552.1, 553.1, 432.3, 435.1; 370/338, 328, 352, 401, 465, 354; 379/221.08, 379/221.09, 229, 230
See application file for complete search history.

(56) References Cited

U.S. PATENT DOCUMENTS

| | | | |
|---|---|---|---|
| 6,073,015 A * | 6/2000 | Berggren et al. | ......... 455/432.2 |
| 6,317,609 B1 * | 11/2001 | Alperovich et al. | ..... 455/556.1 |
| 6,434,385 B1 | 8/2002 | Aucoeur | |
| 6,445,929 B1 | 9/2002 | Chandnani et al. | |
| 6,452,910 B1 | 9/2002 | Vij et al. | |
| 6,510,310 B1 | 1/2003 | Muralidharan | |
| 6,526,033 B1 | 2/2003 | Wang et al. | |
| 6,526,034 B1 | 2/2003 | Gorsuch | |
| 6,687,243 B1 * | 2/2004 | Sayers et al. | ................ 370/356 |
| 6,711,147 B1 * | 3/2004 | Barnes et al. | ................ 370/338 |
| 6,735,184 B1 * | 5/2004 | Davidson et al. | ............ 370/316 |
| 6,813,256 B1 * | 11/2004 | Nevo et al. | .................. 370/335 |
| 6,901,262 B1 * | 5/2005 | Allison et al. | ............ 455/456.1 |
| 2001/0031641 A1 * | 10/2001 | Ung et al. | ................... 455/456 |
| 2002/0052211 A1 | 5/2002 | Kim et al. | |
| 2002/0196779 A1 * | 12/2002 | Khadri et al. | ................ 370/352 |
| 2003/0031307 A1 * | 2/2003 | Khadri et al. | ............. 379/221.1 |
| 2003/0061388 A1 | 3/2003 | Cleghorn et al. | |
| 2004/0125770 A1 * | 7/2004 | Pitt et al. | ..................... 370/331 |

FOREIGN PATENT DOCUMENTS

| | | |
|---|---|---|
| EP | 1109417 | 6/2003 |
| EP | 1244323 | 4/2004 |
| WO | WO 99/14910 | 3/1999 |
| WO | WO 00/79827 | 12/2000 |
| WO | WO 02/091764 | 11/2002 |

* cited by examiner

Primary Examiner—Jean Gelin

(57) ABSTRACT

Systems, methods, and devices are provided in connection with a multiple protocol register. In one embodiment, a mobile subscriber database is provided. The mobile subscriber database includes a location register having a number of different network protocol capabilities. The location register is operable to process different network type messages on the location register.

28 Claims, 2 Drawing Sheets

MULTIPLE PROTOCOL DATABASE

A Public Switched Telephony Network (PSTN) refers to the public phone networks as known by those of ordinary skill in the art. The PSTN is composed of switches and T1/E1 trunks, central office, etc. The PSTN uses circuit-switched technology, in which necessary resources are allocated (dedicated) for the duration of a phone call. An IP network (e.g., the Internet), in contrast, is composed of nodes of computers, servers, routers, and communications links, etc. The IP network employs packet-switching technology that decomposes data (e.g., voice, web pages, e-mail messages, etc.) into IP packets. Each packet is then transmitted over an IP network to a destination identified by an IP address and reassembled at the destination. An IP transmission is completed without pre-allocating resources from point to point.

Traditionally, wireless devices could only access a network by utilizing either a voice or data connection. More recently, mobile handheld multifunction devices capable of multiple network type connections have proliferated. Currently, in the wireless industry, devices have been created that can utilize voice and/or data connections. This versatility is limited by several structural limitations within the networks to which these devices connect. For example, when a session is to be initiated by a device, the device is signaling in a single network protocol and therefore it cannot readily communicate with other networks. Additionally, the networks typically do not service the entire area in which a device may be utilized and therefore, there are times when the device is inaccessible on a particular network.

With each advance of a new protocol into the industry, the infrastructure providing communication between devices must be changed to accommodate the new protocol. Additionally, in order to change the infrastructure without requiring all of their subscribers to purchase devices compatible with the new protocol, many providers are trying to update their existing infrastructure to support both old and new protocols, at least temporarily. Another approach has been to overlap a new or different protocol infrastructure over an area covered by an existing protocol. In this way, both, the users of the old protocol and the users of the new or different protocol, can utilize their devices in the same or similar coverage areas.

Based upon this approach, several networks such as global system for mobile communications (GSM) network and a American National Standards Institute (ANSI) network may overlap each other, at least partially. In this situation it could be possible for the device to switch from communicating with a first network to a second network. However, when two different types of networks are connected and need to communicate information from one to another, a translator or gateway has to be provided to interpret the information from one set of network protocols to another. Currently, each time a new network is connected to the system, a new translator needs to be installed to do the translating from each of the existing networks connected to the system to and from the new network. This also involves a separate routing configuration with a separate off-switch subscriber server.

For example, when a GSM network is connected to another network (such as an ANSI network), the two networks need to be connected with a translator between them. When a data network (such as the Internet) is connected to the GSM-ANSI system, a translator needs to be interposed between the GSM and the data networks as well as another translator between the ANSI and the data networks. This GSM-ANSI-data system then has three networks and three translators translating between them. This adds to the overall cost of the network.

The use of three separate translators also necessitates the multiple entry of subscriber information. This increases the number of network based messages sent to the translator.

DETAILED DESCRIPTION

Embodiments of the present invention provide for the efficient utilization of system and network resources. In various embodiments, a location register accommodates a wireless data deployment for multiple network types. The location register can process different network type messages at a single point code address and can centralize subscriber management. Accordingly, equipment cost can be reduced.

As one of ordinary skill in the art will understand, the embodiments can be performed by software, application modules, and computer executable instructions operable on the systems and devices shown herein or otherwise. The invention, however, is not limited to any particular operating environment or to software written in a particular programming language. Software, application modules and/or computer executable instructions, suitable for carrying out embodiments of the present invention, can be resident in one or more devices or locations or in several and even many locations. Various components, include a computer readable medium, on which a set of computer executable instructions can reside. Many forms of computer readable medium, e.g. Flash memory, RAM, ROM, DDRAM, and the like, can be included in one and/or all of the various embodiments.

Unless explicitly stated, the method embodiments described herein are not constrained to a particular order or sequence. Additionally, some of the described method embodiments can occur or be performed at the same point in time.

As one of ordinary skill in the art will appreciate upon reading this disclosure, a wireless infrastructure can provide cellular/PCS services like call origination and call delivery for a roaming mobile device or handset. For call delivery, a visited network tracks the location of a roaming user and a visitor location register (VLR) reports that location information via a control network to the home location register (HLR) of the home network. Control networks may include ANSI/IS-41 and GSM MAP types of networks. An authentication center (AC in ANSI/IS-41, AuC in GSM) in a home network can be used for user registration and authentication, e.g., checking to see, among other things, if the user has made payments. When a call is relayed from the public switched telephony network (PSTN) to the home mobile switching center (MSC) is to be delivered to a subscriber, the home MSC consults the HLR to determine the current whereabouts of the subscriber, e.g. the current serving/visited MSC, and the call is then directed via links and the PSTN to the visited MSC currently serving the mobile device.

Figure 1:
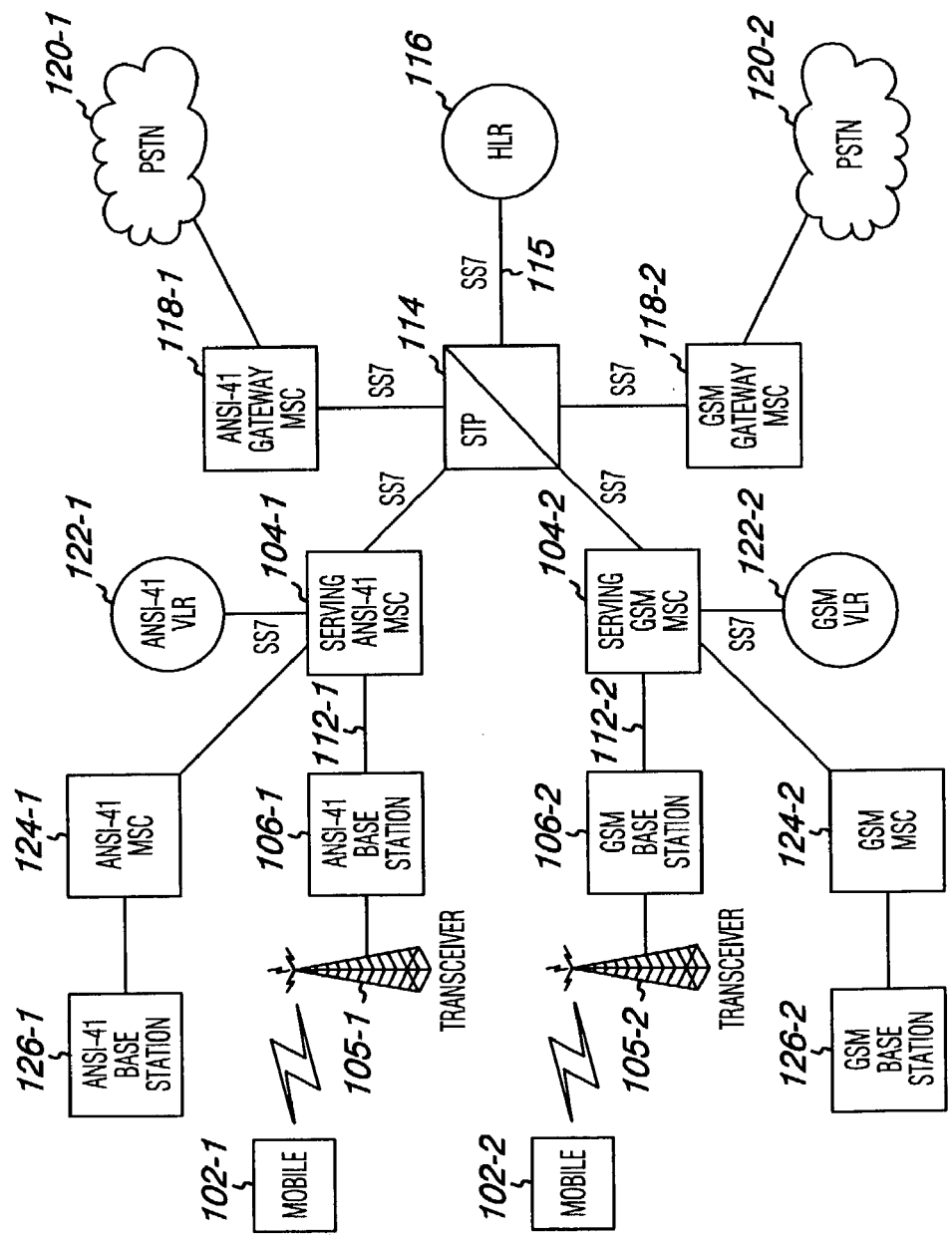
FIG. 1 is a block diagram embodiment of a mobile network illustrating mobile devices communicating in GSM and ANSI-41 environments.

FIG. 1 is a block diagram embodiment of a mobile network illustrating mobile devices communicating in different control network environments. As shown in the embodiment of FIG. 1, one example of a mobile network, or control network, includes an ANSI/IS-41 network and another includes a global system for mobile (GSM) network. In the embodiment of FIG. 1, different mobile devices, 102-1 and 102-2, can be communicating with a mobile switching center (MSC) in these various respective networks, e.g. 104-1 and 104-2.

The heart of a typical wireless telecommunications system is the MSC that is connected to a plurality of base stations that are dispersed throughout the geographic area serviced by the system. The geographic area serviced by a wireless telecommunications system is partitioned into a number of spatially distinct areas called "cells." Each MSC is responsible for, among other things, establishing and maintaining calls between mobile devices and between a mobile device and a wireline terminal, which is connected to the system via the local and/or long-distance networks. An MSC is a telephone switch specialized for wireless and mobility support. An MSC performs various functions, including mobility management, call handoffs, call admission, call control, resource allocation, and so forth. The call is then relayed from the MSC to base stations and via wireless communications to the mobile device.

As shown in the embodiment of FIG. 1, whenever the mobile devices, e.g. 102-1 and 102-2, activate or roam into an MSC coverage area, i.e., the "cell" for which the MSC is responsible, the particular MSC becomes the serving MSC. The mobile device(s) transmit stored identity information to the serving MSCs, 104-1 and 104-2, via transceivers, 105-1 and 105-2 communicating with associated base stations, 106-1 and 106-2.

Base stations, 106-1 and 106-2, can transmit the subscriber identity information to the serving MSCs, 104-1 and 104-2, via communication lines, 112-1 and 112-2 respectively. The procedures and protocol for communication between the base stations and the serving MSCs have been standardized and will not be discussed in detail herein. For an identification of industry standards relating to these communications, reference is made to TIA/EIA/IS634-A, "MSC-BS Interface for Public Wireless Communication Systems."

In order to provide mobile service to newly registered mobile devices 102-1 and 102-2, the serving MSCs, 104-1 and 104-2, transmits a Mobile Application Part (MAP) based signal, such as a registration notification signal (ANSI/IS-41 message in the ANSI network) or a location update signal (GSM message in the GSM network), to a home location register (HLR) 116 via a signaling link such as a signal transfer point (STP) 114. In embodiments contained herein, HLR 116 serves as a location register for multiple network types. That is, as shown in FIG. 1, HLR 116 is serving as an HLR for both the ANSI network and the GSM network.

Implementation of the various embodiments is not limited to the two types of networks shown in FIG. 1. Rather, embodiments of the location register, e.g. 116, are operable to, and can be configured to, communicate with any number of network types. In various embodiments, the location register includes a number of different network type capabilities. One or more of the network types can include a number of wireless subscribers. According to the various embodiments, the location register is operable to recognize different protocols for messages received from the one or more networks. And, the location register is operable to interface messages with one or more appropriate register modules within a database of the location register.

As shown in the embodiment of FIG. 1, the location register, e.g. 116, is coupled to one or more network entities via a signal transfer point (STP) 114. The signal transfer point (STP) 114 is coupled to the location register 116 via a signal link set 115. An STP is a node in the signaling system 7 (SS7) telephone network that routes messages between exchanges and between exchanges and databases that hold subscriber and routing information. An HLR is one such register or database in a cellular system that contains all the subscribers within the provider's home service area. The data in the HLR can be requested and transferred via SS7 to a visitor location register (VLR), e.g. 122-1 or 122-2, in the a roaming area for a respective mobile device, e.g. 102-1 or 102-2 in for the network, e.g. ANSI or GSM in this example, in which the device is operating.

As shown in the embodiment of FIG. 1, an STP 114 can also route MAP based signals to appropriate gateway MSCs 118-1 and 118-2 depending on the network being used. As shown in FIG. 1, gateway MSCs 118-1 and 118-2 can serve as network switches for ingress and egress with the public switched telephone network (PSTN), shown in FIG. 1 as 120-1 and 120-2. SS7 is the protocol used in the PSTN for setting up calls and providing services. The SS7 network sets up and tears down the call, handles all the routing decisions and supports all modem telephony services, such as local number portability (LNP). LNP allows a telephone subscriber to port his/her phone number when that subscriber relocates to a different region of the country, even when the local area code may be different. Voice switches known as service switching points (SSPs) can query service control point (SCP) databases, such as HLR 116 using packet switches referred to as signal transfer points (STPs).

Accessing databases using a separate signaling network enables the system to more efficiently obtain static information such as the services a customer has signed up for and dynamic information such as ever-changing traffic conditions in the network. In addition, a voice circuit is not tied up until a connection is actually made between both parties. There is an international version of SS7 standardized by the ITU, and national versions determined by each country. For example, ANSI governs the US standard for SS7, and Telcordia (Bellcore) provides an extension of ANSI for its member companies.

The MAP based signal informs the location register, e.g. HLR 116 in FIG. 1, of the network address associated with the MSC, e.g. 104-1 or 104-2, currently serving a given mobile device, e.g. 102-1 or 102-2, and also request requisite subscriber information for providing mobile service to those mobile devices, 102-1 and 102-2. The HLR 116 updates its database to store the network addresses representing the serving MSCs, 104-1 and 104-2, and also copies the requested subscriber information to the appropriate visitor location registers (VLRs), e.g. 122-1 and 122-2, associated with the serving MSCs 104-1 and 104-2. The network addresses stored in the HLR 116, representing the serving MSCs, 104-1 and 104-2, are later utilized by the respective networks to reroute any incoming calls intended for the mobile devices, 102-1 and 102-2, to the serving MSCs, 104-1 and 104-2.

Accordingly, whenever a telecommunications subscriber dials a telephone number for a mobile device, e.g. 102-1 or 102-2 in this example, the HLR 116 is queried by the mobile network to determine the current location of the those devices 102-1 and 102-2. Utilizing the stored network addresses in HLR 116 representing the serving MSCs 104-1 and 104-2, the HLR 116 requests a roaming number from the serving MSCs 104-1 and 104-2 in response to the receipt of the query signal. The roaming number provided by the serving MSCs 104-1 and 104-2 is then used by the telecommunications network to route the incoming signal towards the serving MSCs 104-1 and 104-2. The serving MSCs 104-1 and 104-2 then page the appropriate mobile device 102-1 or 102-2 and accordingly establish a voice connection with the respective mobile device 102-1 or 102-2, if available.

If a mobile device 102-1 or 102-2 roams out of a serving MSCs 104-1 and 104-2 coverage area and into another MSCs coverage area, e.g. 124-1 or 124-2, the previously serving MSCs 104-1 and 104-2 will hand-off the communication to those MSCs 124-1 and 124-2 and their associated and base stations 126-1 and 126-2 in the new coverage areas. To ensure compatibility between two MSCs, the procedures and protocol for the format and transmission of messages have been standardized. For an identification of industry standards relating to these communications, reference is made to ANSI/IS-41,"Cellular Radio telecommunications Intersystem Operations."

Figure 2:
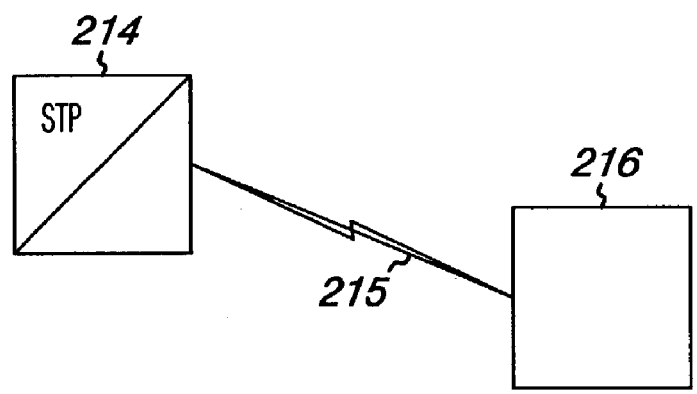
FIG. 2 illustrates an embodiment of an interface between a signal transfer point and a location register.

FIG. 2 illustrates an embodiment of an interface between an STP 214 and a location register or subscriber server 216. The STP 214 can serve as STP 114 shown in FIG. 1 and the location register 216 can serve as the HLR 116 shown in FIG. 1. The invention, however, is not so limited.

The location register or subscriber server 216 includes functionality and applications capabilities to accommodate messages from a number of network types. In the various embodiments, the location register 216 has a single point code address. That is, the location register 216 can be addressed with a single point code regardless of the type of message being transmitted to the location register 216. This is in contrast to needing a separate routing configuration and separate off-switch register, e.g. an off-switch HLR. As shown in the embodiment of FIG. 2, the STP 214 is operably coupled to the location register 216 via a set of signal links 215. In various embodiments, the set of signal links include SS7 signal links 215. Via signal links 215, messages can be passed between the STP 214 and the location register 216.

In various embodiments, the location register 216 can be part of a service control point (SCP) database. In various embodiments the location register 216 can include a S-Series single SCP-based location register node having a single point code address. In various embodiments, the location register 216 can include a non-stop server.

Figure 3:
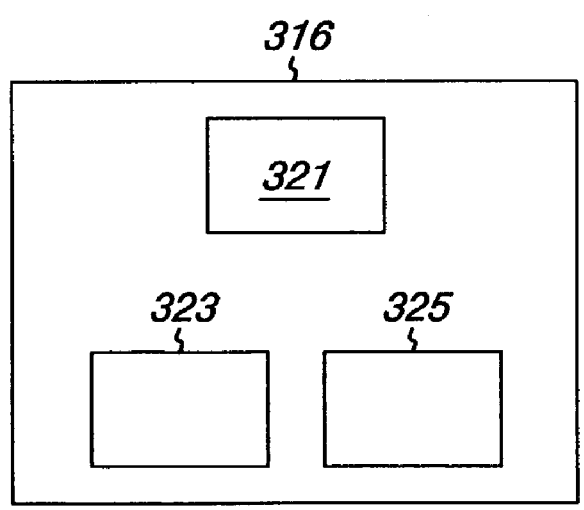
FIG. 3 illustrates an embodiment of a location register.

FIG. 3 illustrates an embodiment of a location register 316. As shown in the embodiment of FIG. 3, the location register 316 includes one or application modules, sets of computer executable instructions, and/or software 321 operable thereon. The one or application modules, sets of computer executable instructions, and/or software 321 are operable to receive messages from a number of network types, e.g. ANSI, GSM, and/or other message types.

In the various embodiments the one or application modules, sets of computer executable instructions, and/or software 321 are operable to recognize different protocols for messages received from the number of network types. As in the embodiment of FIG. 3, the one or application modules, sets of computer executable instructions, and/or software 321 are operable to interface messages with an appropriate register module, shown in FIG. 3 as 323 and 325, within the location register 316. By way of example and not by way of limitation, register module 323 can be an ANSI register module and register module 325 can be a GSM register module. The invention, however, is not so limited.

Thus, as shown in the various embodiments, one or more sets of executable instructions are operable on a location register database or a subscriber server, e.g. 116, 216, and 316 to perform embodiments of the invention. These embodiments include receiving one or more messages according to different network protocols. In various embodiments the one or more messages can be received at a single point code address. In various embodiments, receiving one or more messages according to different network protocols includes receiving messages from a particular signal traffic source. And, in various embodiments, receiving one or more messages according to different network protocols includes receiving messages according to different network protocols over an SS7 link.

The embodiments further include provisioning one or more different network applications based on the messages received at a single point code address. In this manner, the embodiments provide for centralizing subscriber management for a number of network types. In various embodiments, centralizing subscriber management for a number of network types includes centrally processing messages having a number of different network protocols. In various embodiments centralizing subscriber management for a number of network types includes centralizing subscriber management for both a GSM network and an ANSI network.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. § 1.72(b) requiring an Abstract that will allow the reader to quickly ascertain the nature of the technical disclosure. It is submitted with the understanding that it will not be used to limit the scope of the claims.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A mobile subscriber database, comprising:
 a single point code address to receive one or more messages according to different network types from a particular signal traffic source without using a separate routing configuration and without using a separate off-switch register;

a computer readable medium having a set of executable instructions to recognize different protocols for messages received from the different network types; and wherein the set of executable instructions is operable to interface messages with an appropriate register module within the database.

2. The database of claim 1, wherein the database includes a number of different network type register modules for different network type applications.

3. The database of claim 1, wherein the database is interfaced to a voice network via a signaling system seven (SS7) link.

4. The database of claim 1, wherein the database can be accessed by the single point code address via a signal transfer point (STP) as the particular signal traffic source using a single transport mechanism.

5. The database of claim 1, wherein the database includes a S-Series single SCP-based location register node.

6. A mobile subscriber database, comprising:
a location register having a number of different network type capabilities; and
wherein the location register is operable to process different network type messages from one or more network entities; and
wherein the location register includes a single point code address to receive one or more messages according to different network types from a particular signal traffic source without using a separate routing configuration and without using a separate off-switch register.

7. The database of claim 6, wherein the number of different network type capabilities include both a Global System for Mobile (GSM) home location register (HLR) capability and an American National Standards Institute (ANSI) HLR capability.

8. The database of claim 6, wherein the location register is addressable using the single point code address and the particular signal traffic source is an STP.

9. A wireless system, comprising:
a location register operable to communicate with one or more networks, wherein at least one network includes a number of wireless subscribers, and wherein the location register is operable to;
recognize different protocols for messages received from the one or more networks without using a separate routing configuration and without using a separate off-switch register; and
interface messages with one or more appropriate register modules within the database; and
a signal transfer point (STP) coupled to the location register via a signal link, such that the SIP serves as a particular signal traffic source to communicate different network protocols and message types, associated with the different networks, to the location register using the link.

10. The system of claim 9, wherein the one or more networks includes one or more networks selected from the group of a GSM network and an ANSI network.

11. The system of claim 9, wherein the one or more appropriate register modules includes one or more register modules selected from the group of an ANSI home location register module (HLR) and a GSM HLR.

12. The system of claim 9, wherein the location register includes a computer readable medium having a set of computer readable instructions thereon, and wherein the location register includes one or more databases.

13. The system of claim 9, wherein the location register is accessible via a single point code address using a single transport mechanism from the STP as the particular traffic source.

14. The system of claim 9, wherein at least one of the networks includes a global system for mobile (GSM) radio access interface.

15. The system of claim 9, wherein at least one of the networks includes a code division multiple access (CDMA) radio access interface.

16. A wireless architecture, comprising:
a location register database operable to communicate with one or more networks and accessible using a single point code address without using a separate routing configuration and without using a separate off-switch register, wherein at least one network includes a number of wireless subscribers;
means for provisioning applications according to a number of different network protocols; and
a signal transfer point (STP) coupled to the location register database as a single signal traffic source to communicate different network protocols and message types, associated with the different networks, to the location register database using the single point code address.

17. The wireless architecture of claim 16, wherein the location register database includes a database having GSM and ANSI home location register capabilities.

18. The wireless architecture of claim 16, wherein the means for provisioning applications according to a number of different network protocols includes a set of computer executable instructions operable on both GSM and ANSI messages.

19. The wireless architecture of claim 16, wherein the means for provisioning applications includes logic means for centralizing subscriber management for both a GSM network and an ANSI network.

20. The wireless architecture of claim 16, wherein the means for provisioning applications according to a number of different network protocols includes provisioning applications based on messages sent to the single point code address.

21. The wireless architecture of claim 20, wherein the single signal traffic source includes an SS7 link as its transport mechanism.

22. A method for a wireless system, comprising;
receiving one or more messages according to different network protocols at a single point code address;
provisioning one or more different network applications based on the messages received at the single point code address; and
using the single point code address to communicate messages to a location register database via a particular transport source without using a separate routing configuration and without using a separate off-switch register.

23. The method of claim 22, wherein the method further includes centralizing subscriber management for a number of network types.

24. The method of claim 23, wherein centralizing subscriber management for a number of network types includes centralizing subscriber management for both a GSM network and an ANSI network.

25. A computer readable medium having instructions for causing a device to perform a method, comprising:
receiving one or more messages according to different network protocols on a location register;

centralizing subscriber management for a number of network types on the location register; and using a single point code address to communicate messages to the location register via a particular transport source without using a separate routing configuration and without using a separate off-switch register.

26. The computer readable medium of claim 25, wherein receiving one or more messages according to different network protocols on the location register includes receiving messages to the single point code address via a signal transfer point as the particular signal transport source.

27. The computer readable medium of claim 25, wherein centralizing subscriber management for a number of voice network types includes centrally processing messages having a number of different network protocols.

28. The computer readable medium of claim 27, wherein centrally processing messages having a number of different network protocols includes centrally processing both ANSI and GSM messages received at the single point code address.

* * * * *

UNITED STATES PATENT AND TRADEMARK OFFICE
CERTIFICATE OF CORRECTION

| | | |
|---|---|---|
| PATENT NO. | : 7,127,235 B2 | Page 1 of 1 |
| APPLICATION NO. | : 10/426392 | |
| DATED | : October 24, 2006 | |
| INVENTOR(S) | : Bradley T. Kenyon et al. | |

It is certified that error appears in the above-identified patent and that said Letters Patent is hereby corrected as shown below:

In column 4, line 27, delete "modem" and insert -- modern --, therefor.

In column 7, line 52, in Claim 9, delete "SIP" and insert -- STP --, therefor.

Signed and Sealed this

Twenty-third Day of March, 2010

David J. Kappos
*Director of the United States Patent and Trademark Office*